United States Patent [19]

Miyakawa

[11] Patent Number: 5,084,762
[45] Date of Patent: Jan. 28, 1992

[54] UNDER-COLOR REMOVAL METHOD AND DEVICE THEREFOR

[75] Inventor: Tadashi Miyakawa, Kaisei-Machi, Japan

[73] Assignee: Fuji Photo Film Co., Ltd., Kanagawa, Japan

[21] Appl. No.: 461,517

[22] Filed: Dec. 28, 1989

[30] Foreign Application Priority Data

Dec. 28, 1988 [JP] Japan .................. 63-333838

[51] Int. Cl.$^5$ .............................................. G03F 3/08
[52] U.S. Cl. ........................................ 358/79; 358/400
[58] Field of Search .............. 358/75, 79, 80, 400, 358/401, 443, 447, 448

[56] References Cited

U.S. PATENT DOCUMENTS

| | | | |
|---|---|---|---|
| 4,763,190 | 8/1988 | Froelich | 358/79 |
| 4,897,799 | 1/1990 | Le Gall et al. | 358/400 |
| 4,930,007 | 5/1990 | Sugiura et al. | 358/467 |
| 4,985,759 | 1/1991 | Ito | 358/75 |
| 5,016,097 | 5/1991 | Shimano | 358/79 |

*Primary Examiner*—Stephen Brinich
*Attorney, Agent, or Firm*—Sughrue, Mion, Zinn, Macpeak & Seas

[57] ABSTRACT

A method and device for obtaining, by rapid and accurate calculation, a black-printer amount and a under-color amount to be removed in order to reproduce colors which are required on the prints. According to this invention, there is provided an under-color removal method and the device therefor including the steps of selecting a minimum density out of equivalent neutral densities of three primary colors in order to reproduce desired colors, calculating a black-printer amount of said selected equivalent neutral densities using a predetermined function, calculating the amounts of three primary color under-colors to be removed based on the three primary color equivalent neutral densities and the black-printer amount respectively and by means of a preset look-up table, subtracting the three primary color under-color removal amounts from the three primary color equivalent neutral densities, obtaining an amount of ink or dot percentage corresponding to a difference of the substraction and to the black-printer amount, and outputting the same.

8 Claims, 3 Drawing Sheets

5,084,762

UNDER-COLOR REMOVAL METHOD AND DEVICE THEREFOR

BACKGROUND OF THE INVENTION

This invention relates to a method for under-color removal which is applicable to plate processing machines and to a device therefor.

Japanese Patent Laid-open No. 173838/1982 discloses a method for removing under-colors which calculates the amount of under-colors to be removed as against black-printer amount to be generated by means of an approximation. However, the known method is not satisfactory because when the black-printer amount is increased/decreased for the same color on an original, it cannot always calculate the precise amount to be removed to thereby instabilize colors in printed matters.

Japanese Patent Laid-open No. 34072/1988 discloses another method for removing under-colors. However, the method is detrimental in that as it calculates the amount of under-colors to remove by convergence, it cannot conduct operational processing in real time.

SUMMARY OF THE INVENTION

An object of this invention is to obviate the aforementioned defects encountered in the prior art, and to provide a method and a device which can obtain, by rapid and accurate calculation, the black-printer amount and the under-color amount to be removed in order to reproduce colors which are required on the prints.

According to one aspect of this invention, for achieving the object described above, there is provided an under-color removal method including the steps of selecting a minimum density out of equivalent neutral densities of three primary colors in order to reproduce desired colors on a print, calculating a black-printer amount of the selected equivalent neutral densities using a predetermined function, calculating the amounts of three primary color under-colors to be removed based on the three primary color equivalent neutral densities and the black-printer amount respectively and by means of a preset look-up table, subtracting the three primary color under-color removal amounts from the three primary color equivalent neutral densities, obtaining an amount of ink or dot percentage corresponding to a difference of the subtraction and to the black-printer amount, and outputting the same.

According to another aspect of this invention, there is provided a device for removing under-color including a black-printer amount calculating means for obtaining black-printer amount as a function of a minimum value of three primary color equivalent neutral densities for reproducing desired colors on a print, means for calculating the under-color removing amount according to the data on preset look-up tables based on the combination of the three primary color equivalent neutral densities and the black-printer amount, and converting means which respectively convert four color equivalent neutral densities obtained by the black-printer amount calculating means and the calculating means into an amount of ink or dot percentage.

The nature, principle and utility of the invention will become more apparent from the following detailed description when read in conjunction with the accompanying drawings.

PREFERRED EMBODIMENT OF THE INVENTION

Figure 1:
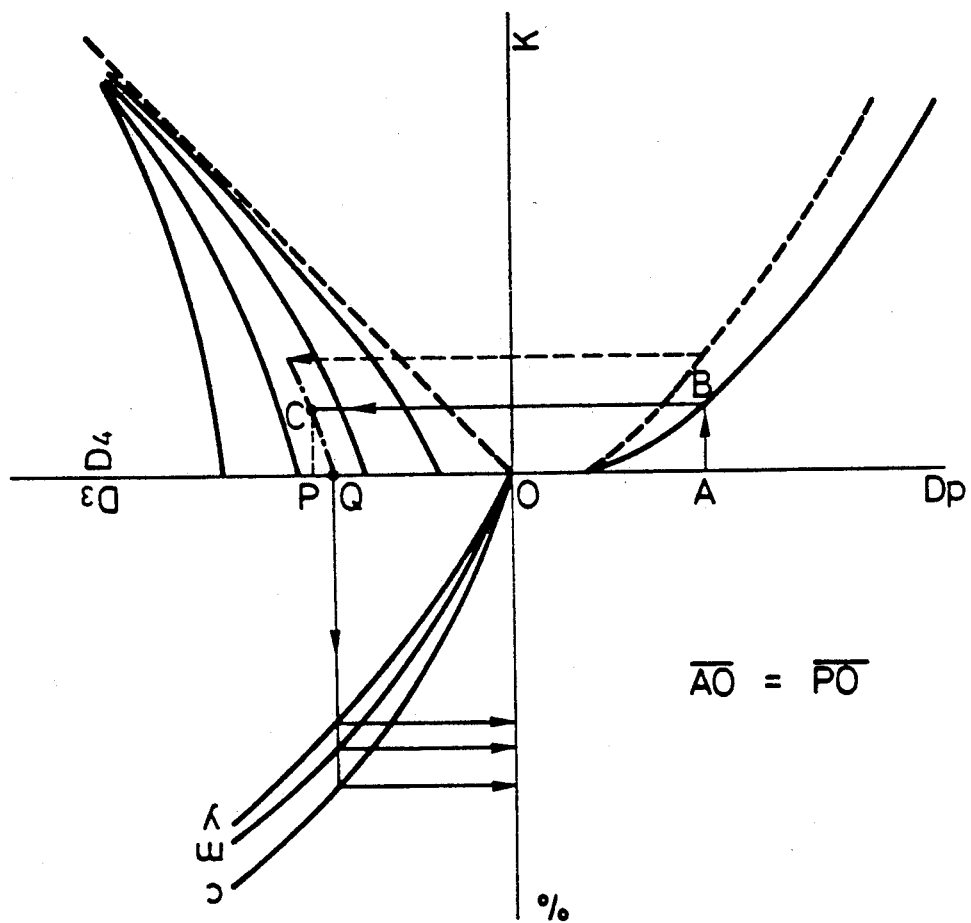
FIG. 1 is an explanatory view to describe the principle of the under-color removal method according to this invention.

This invention, as shown in FIG. 1 with characteristic curves, can express on the common axes the characteristics of an equivalent neutral density $D_p$ against black-printer amount, the characteristic of the equivalent neutral density on the print $D_3$ made of C (cyan), M (magenta) and Y (yellow) against dot percentage, and the characteristic of the equivalent neutral density $D_4$ made of C, M, Y and K plates against the black-printer amount. This indicates that a point C which represents the equivalent neutral density obtained by the printers of Y, M, C and K removed of under-colors can be obtained from the black-printer amount $\overline{AB}$ for a desirable density $\overline{OA}$ on the print product and further the equivalent neutral density $\overline{OQ}$ of the printers Y, M and C removed of under-colors can be obtained.

Since the densities of CMY are varied at the equivalent neutral density according to this invention, the density balance can be maintained even if the black-printer amount changes. By using reversely a look-up table of gray density obtained by combining equivalent neutral densities of three primary colors and the black printer amount which have been experimentally obtained in advance, the amount of under-colors to be removed may easily be obtained.

Figure 2:
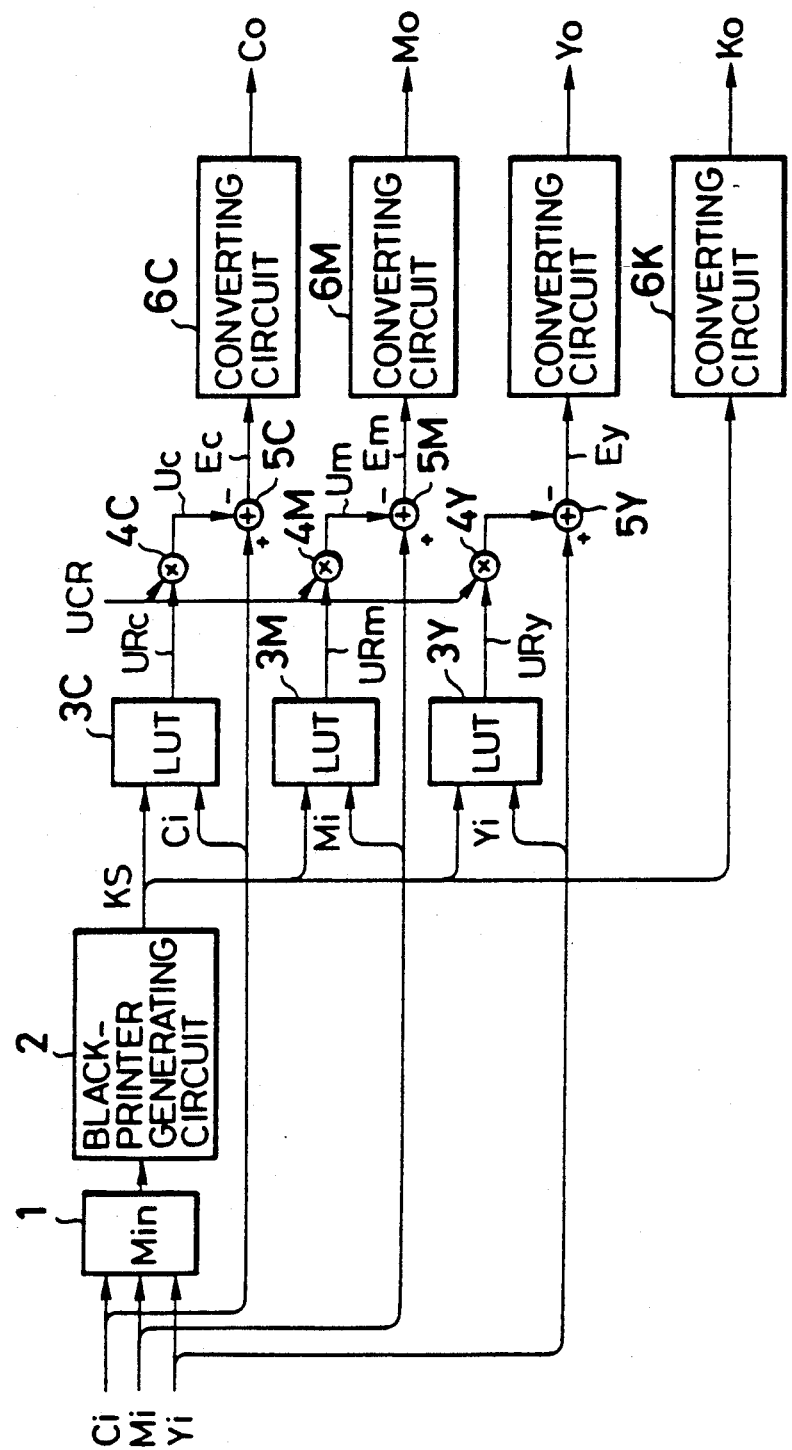
FIG. 2 is a block diagram to show an embodiment of this invention.

FIG. 2 shows an embodiment of this invention wherein equivalent neutral densities $C_i$, $M_i$ and $Y_i$ of the three primary colors C, M and Y are input to a minimal value circuit 1 in order to select the minimal value as well as at look-up tables 3C, 3M and 3Y as address data, and to subtraction circuits 5C, 5M and 5Y. The signal of which value is selected as the minimal out of the equivalent neutral densities $C_i$, $M_i$ and $Y_i$ at the minimal value circuit 1 or one of the equivalent neutral densities $C_i$, $M_i$ and $Y_i$ is input to a black-printer generating circuit 2 which generates black-printer amount with the function, $KS = f(M_{in})$. The output signal KS therefrom is input to the look-up tables 3C, 3M and 3Y as address data, and simultaneously input to a converting circuit 6K for the K-printer. The look-up tables 3C, 3M and 3Y are the ones which store under-color amounts obtained experimentally in advance, and output the under-color removing amounts $UR_c$, $UR_m$ and $UR_y$, in accordance with input value KS and $C_i$, KS and $M_i$, and KS and $Y_i$, as address data, and multiply the output values with the under-color removal intensity signals UCR which are separately input respectively. The under-color removal amounts $U_c$, $U_m$ and $U_y$ obtained by the multiplying circuits 4C, 4M and 4Y are input respectively to subtracters 5C, 5M and 5Y, and correction signals $E_c$, $E_m$ and $E_y$ subtracted are input to converting circuits 6C, 6M and 6Y. The converting circuits 6C, 6M, 6Y and 6K are adapted to output signals $C_o$, $M_o$, $Y_o$ and $K_o$ of the ink amount or dot percentage % in correspondence to the input values, respectively.

A black-printer amount is therefore determined in accordance with the minimal value among the three primary color equivalent neutral densities $C_i$, $M_i$ and $Y_i$ and under-color removal amounts $UR_c$, $UR_m$ and $UR_y$ which have been set are selected in accordance with the thus-determined black-printer amount and the three color equivalent neutral densities $C_i$, $M_i$ and $Y_i$. The thus obtained under-color removal amounts $UR_c$, $UR_m$ and $UR_y$ are corrected with an under-color removal intensity signal UCR, and the corrected under-color removal amounts $U_c$, $U_m$ and $U_y$ are subtracted from the equivalent neutral densities $C_i$, $M_i$ and $Y_i$ to thereby obtain correction signals $E_c$, $E_m$ and $E_y$. The correction signals $E_c$, $E_m$ and $E_y$ are converted into the ink amount or dot percentage % by the converting circuits 6C, 6M and 6Y while the black-printer amount KS is converted to the ink amount or dot percentage % by the converting circuit 6K.

Figure 3:
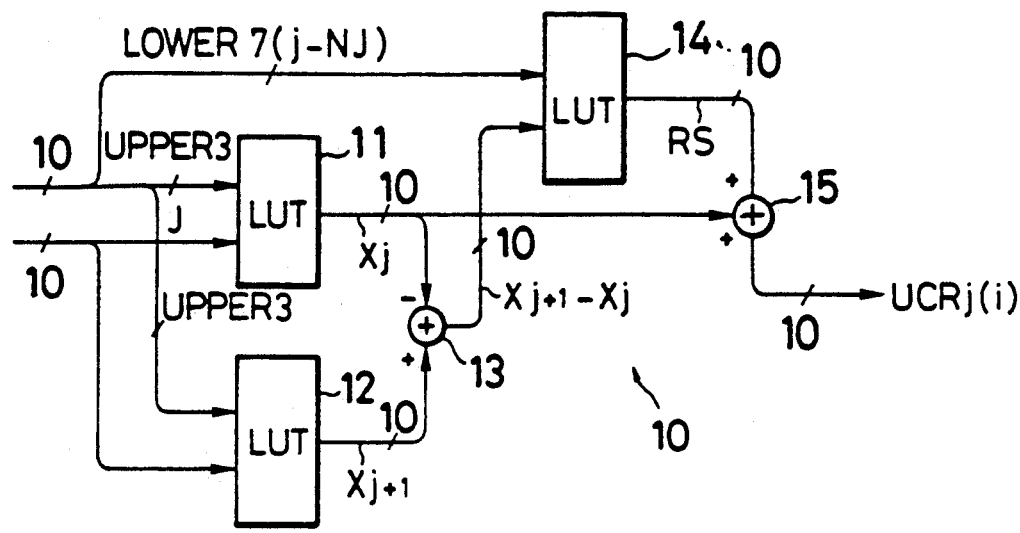
FIG. 3 is a block diagram to show an embodiment of the structure of the data table for calculating under-color removal.

FIG. 3 shows the structure of the look-up tables 3C, 3M and 3Y with a specific UCR amount calculation table 10. The look-up table 11 stores density data of the equivalent neutral density $D_4$ when K=0, while the look-up table 12 stores the equivalent neutral density $D_4$ when K=0. For example, a 10-bit signal j is input on the upper 3 bits (J) to the look-up tables 11 and 12 while the subsequent 7 bits (j-NJ) are input to the look-up table 14. A signal i of 10 bits is input to the look-up tables 11 and 12, and the output (of 10 bits) $X_j$ of the look-up table 11 and the output $X_{j+1}$ (10 bits) of the look-up table 12 are input to the subtracter 13. The difference $(X_{j+1}-X_j)$ is input to the look-up table 14. The lower 7 bits of the signal j is multiplied with the difference $(X_{j+1}-X_j)$, and the product is divided by N pixels. The result of the above calculations RS $(=(j-NJ)\cdot(X_{j+1}-X_j)/N)$ is input to an adder 15 to be added to the output $X_j$ from the look-up table 11. The result is output as the under-color removal amounts $UCR_j(i)$.

If the following relation holds for the integers N, J, $$N \cdot J \leq j \leq N \cdot (j+1) \quad (1)$$

it can be interpreted as the relation (2)

$$X_j = UCR_{NJ}(i) \quad (2)$$

and linear interpolation is conducted on (3)

$$UCR_j(i) = (X_j p + X_{j+1} \cdot q)/(p+q) \quad (3)$$

As the relation holds as (4), $$\left. \begin{array}{l} p = \{N(j+1) - j\}/N \\ q = (j - NJ)/N \\ p + q = 1 \end{array} \right\} \quad (4)$$

the relation holds as (5)

$$UCR_j(i) = X_j + (j-NJ)(X_{j+1}-X_j)/N \quad (5)$$

If it is assumed that j=0-1023, N=8, J=0-127, the structure is obtained as shown in FIG. 3 wherein the upper 3 bits (J) of the signals j and i are input to the look-up tables 11 and 12. The content of the look-up table 11 holds the relation $UCR_{NJ}(i) = X_j$ while the content of the look-up table 12 holds the relation $UCR_{N(J+1)}(i) = X_{j+1}$. The look-up table 14 receives as an input $(X_j-X_{j+1})$ obtained from the look-up tables 11 and 12 as well as the lower 7 bits (j-NJ). The content of the look-up table 14 is the result of the calculation, 7 bit (0-127)×10 bits (0-1023)/N. As a result, the value (j-NJ) $(X_{j+1}-X_j)/N)=RS$ is obtained.

Figure 4:
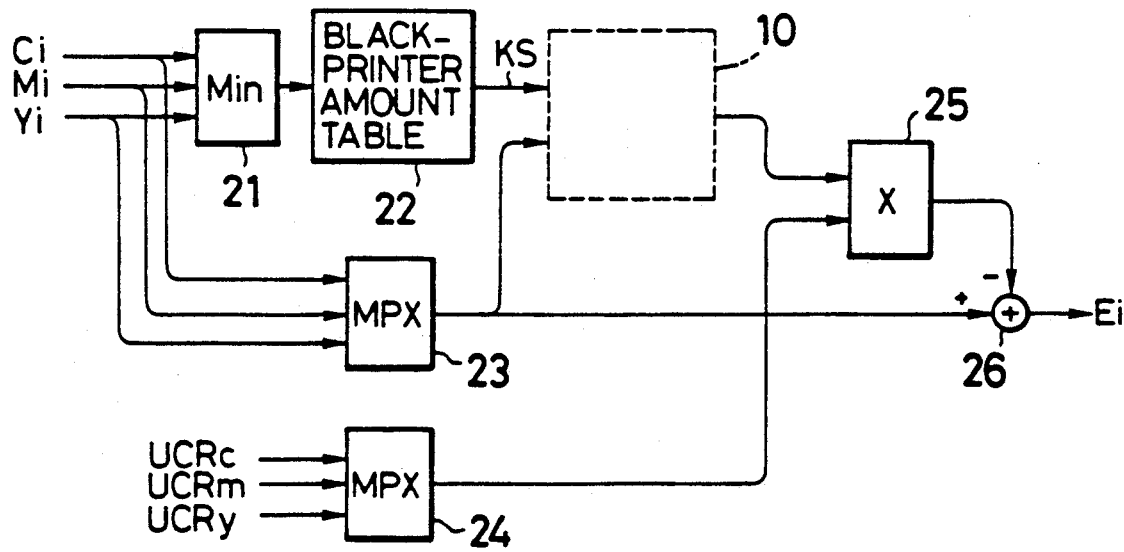
FIG. 4 is a block diagram to show another embodiment of this invention.

FIG. 4 shows another embodiment of this invention where the UCR amount calculation table 10 shown in FIG. 3 is used. In the embodiment, a multiplexer 23 selectively outputs the equivalent neutral densities $C_i$, $M_i$ and $Y_i$ sequentially, and simultaneously a multiplexer 24 selects the under-color removal intensity signals $UCR_c$, $UCR_m$ and $UCR_y$ corresponding to the three primary colors, and input them to a multiplying circuit 25. In this device, the multiplexers 23 and 24 are switched for each of CMY, and output the correction signal $E_i$ required for each of CMY.

As described in the foregoing statement, the under-color removing method and the device therefor according to this invention are capable of calculating the black-printer amount and the under-color removal amount rapidly and accurately in order to obtain desired colors on prints.

It should be understood that many modifications and adaptations of the invention will become apparent to those skilled in the art and it is intended to encompass such obvious modifications and changes in the scope of the claims appended hereto.

What is claimed is:

1. An under-color removal method, comprising the steps of:
    (a) selecting a minimum density out of equivalent neutral densities of three primary colors in order to reproduce desired colors on a print,
    (b) calculating a black-printer amount of said selected equivalent neutral densities using a predetermined function,
    (c) calculating three primary color under-color removal amounts to be removed based on said three primary color equivalent neutral densities and said black-printer amount, respectively, and by means of a preset look-up table,
    (d) subtracting said three primary color under-color removal amounts from said three primary color equivalent neutral densities to produce correction signals, and
    (e) obtaining an amount of ink or dot percentage for each of said correction signals and said black-printer amount.

2. An under-color removal method according to claim 1, wherein step (c) comprises the steps of:
    (c1) calculating uncorrected removal amounts of said three primary colors based on said three primary color equivalent neutral densities and said black-printer amount, and
    (c2) respectively multiplying said uncorrected removal amounts of said three primary colors with an under-color removal intensity signal to produce said three primary color under-color removal amounts.

3. A device for removing under-color, comprising:
black-printer amount calculating means for obtaining a black-printer amount as a function of a minimum value of three primary color equivalent neutral densities of three primary colors for reproducing desired colors on a print, means for calculating an under-color removing amount according to data in preset look-up tables for each of said three primary colors based on the combination of said three primary color equivalent neutral densities and said black-printer amount, and converting means for respectively converting said three primary color equivalent neutral densities and said black-printer amount into either an amount of ink or a dot percentage.

4. A device for removing under-color according to claim 3, wherein said preset look-up tables respectively comprise first and second look-up tables which respectively store upper bits of density data of one of said three primary color equivalent neutral densities when the black-printer amount is zero, a third look-up table which stores lower bits of said density data, a subtracter which subtracts outputs of the first look-up table from outputs of the second look-up table and inputs the subtracted data to the third look-up table, and an adder which adds the outputs of the first look-up table and the outputs of the third look-up table to obtain the under-color removing amounts.

5. A device for removing under-color according to claim 4, wherein the first and the second look-up tables input upper bits J of a signal j and a signal i, the third look-up table inputs lower bits (j−NJ) of the signal j, the first look-up table outputs a signal $X_j$, the second look-up table outputs a signal $X_{j+1}$, the subtracter outputs a signal $X_{j+1} - X_j$, the third look-up table outputs a signal $(j-NJ)(X_{j+1} - X_j)/N$ for N pixels and the adder outputs the under-color removing amounts $UCR_f(i)$.

6. A device for removing under-color according to claim 5, wherein the under-color removal amounts $UCR_f(i)$ is obtained as $X_j + (j-NJ)(X_{j+1} - X_j)/N$.

7. A device for removing under-color, comprising:
black-printer amount calculating means for obtaining a black-printer amount as a function of a minimum value of three primary color equivalent neutral densities for reproducing desired colors,
a first multiplexer which selects one of the three primary color equivalent neutral densities,
a second multiplexer which selects one of three under-color removal intensity signals for the three primary colors,
means for calculating an under-color removing amount according to the data in a preset look-up table based on the combination of the output of the first multiplexer and the black-printer amount,
a multiplier which multiplies the under-color removing amount and the output of the second multiplexer, and
a subtracter which subtracts the multiplied data from the output of the first multiplexer.

8. A device for removing under-color according to claim 7, wherein said preset look-up table comprises first and second look-up tables which respectively store upper bits of density data of one of the three primary colors equivalent neutral densities when the black-printer amount is zero, a third look-up table which stores lower bits of the density data, a subtracter which subtracts outputs of the first look-up table from outputs of the second look-up table and inputs the subtracted data to the third look-up table, and an adder which adds the outputs of the first look-up table and the outputs of the third look-up table to obtain the under-color removing amounts.

* * * * *